United States Patent
Morovic et al.

(10) Patent No.: US 11,381,712 B2
(45) Date of Patent: Jul. 5, 2022

(54) PRINTER CALIBRATION WITH COLORS SELECTED ACCORDING TO COLOR DIFFERENCES BETWEEN CORRESPONDING COLORMETRIC VALUES

(71) Applicant: Hewlett-Packard Development Company, L.P., Houston, TX (US)

(72) Inventors: Jan Morovic, London (GB); Hector Gomez Minano, Sant Cugat del Valles (ES); Peter Morovic, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 441 days.

(21) Appl. No.: 16/098,101

(22) PCT Filed: Jul. 13, 2016

(86) PCT No.: PCT/EP2016/066679
§ 371 (c)(1),
(2) Date: Oct. 31, 2018

(87) PCT Pub. No.: WO2018/010787
PCT Pub. Date: Jan. 18, 2018

(65) Prior Publication Data
US 2019/0149698 A1    May 16, 2019

(51) Int. Cl.
*H04N 1/60*    (2006.01)
*G01J 3/46*    (2006.01)
(Continued)

(52) U.S. Cl.
CPC ............ *H04N 1/6033* (2013.01); *G01J 3/463* (2013.01); *G06K 15/027* (2013.01);
(Continued)

(58) Field of Classification Search
CPC ............ H04N 1/6033; H04N 1/00045; H04N 1/6055; G06K 15/027; G01J 3/463; G01J 2003/466
See application file for complete search history.

(56) References Cited

U.S. PATENT DOCUMENTS 6,840,597 B1    1/2005  Wilson et al.
7,154,634 B2   12/2006  Hung
(Continued)

FOREIGN PATENT DOCUMENTS

CN         101662571        3/2010

OTHER PUBLICATIONS

Steve Anchell, Printer Calibration Using the Spyderprint, Nov.-Dec. 2013, < http://phototechmag.com/printer-calibration-using-the-spyderprint/>, 5 pages.

*Primary Examiner* — Christopher Wait
(74) *Attorney, Agent, or Firm* — HP Inc. Patent Department

(57) ABSTRACT

A method is described in which sets of corresponding colorimetric values are obtained. In a set, a colorimetric value is associated with a device color. A number of device colors are selected according to the color differences between colorimetric values associated with the same device color. A color calibration pattern is elaborated for a printer to be calibrated using the selected device colors and calibration is performed using the sets of colorimetric values.

20 Claims, 2 Drawing Sheets

(51) Int. Cl.
*G06K 15/02* (2006.01)
*H04N 1/00* (2006.01)

(52) U.S. Cl.
CPC ....... *H04N 1/00045* (2013.01); *H04N 1/6055* (2013.01); *G01J 2003/466* (2013.01)

(56) References Cited

U.S. PATENT DOCUMENTS

| | | |
|---|---|---|
| 8,896,892 B2 | 11/2014 | Wen et al. |
| 2007/0002344 A1* | 1/2007 | Klassen ............. H04N 1/00023 358/1.9 |
| 2011/0228290 A1 | 9/2011 | Dalal et al. |
| 2011/0286018 A1 | 11/2011 | Hashizume |
| 2012/0147391 A1 | 6/2012 | Bala et al. |
| 2014/0355016 A1 | 12/2014 | Kondo |
| 2016/0044209 A1 | 2/2016 | Tsukano |
| 2016/0155032 A1* | 6/2016 | Morovic ............. H04N 1/6025 358/504 |

\* cited by examiner

PRINTER CALIBRATION WITH COLORS SELECTED ACCORDING TO COLOR DIFFERENCES BETWEEN CORRESPONDING COLORMETRIC VALUES

BACKGROUND

Some printers can be color-calibrated to obtain more consistent colors which maintain the stability of a printer's color output. Calibration may comprise printing a pattern of colors. This pattern of colors may be compared to a reference and adjustments may be applied to the printer's parameters. Some printers also use arrays of printing devices that may apply printing fluid simultaneously on a page, and each printing device has to be calibrated.

BRIEF DESCRIPTION OF THE DRAWINGS

The following detailed description references the drawings, wherein.

DETAILED DESCRIPTION

Figure 1:
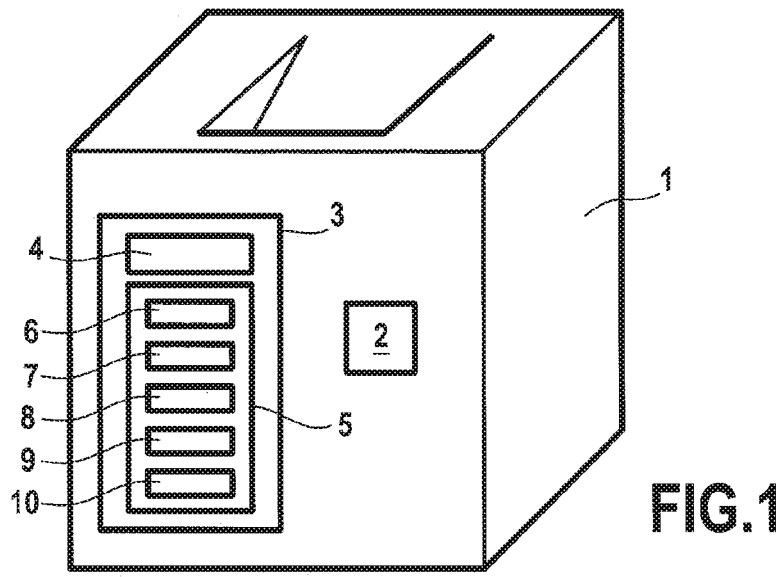
FIG. 1 is a simplified schematic of an example printer.

The following detailed description refers to the accompanying drawings. Wherever possible, the same reference numbers are used in the drawings and the following description to refer to the same or similar parts. While several examples are described in this document, modifications, adaptations, and other implementations are possible. Accordingly, the following detailed description does not limit the disclosed examples. Instead, the proper scope of the disclosed examples may be defined by the appended claims.

In a printer, color calibration may have a variety of requirements and constraints depending on the requested duration and the requested accuracy.

In some page-wide array printers, which have a plurality of print heads arranged in an array or a single print head and a plurality of nozzles arranged in an array, a technical challenge arises due to the number of elements to be calibrated which may be large and therefore the calibration may be long and complex. Improved calibration may be achieved according to the present disclosure because calibration can be performed on the basis of a controlled number of colors to be printed and measured during calibration. This controlled number of colors may be chosen depending on the application with great flexibility.

Also, the present disclosure may improve various methods for calibration.

On FIG. 1, an example color printer 1 is shown. A color printer 1 may be any appropriate printing device that performs an imaging operation with printing fluid with color. A printing fluid may be dye-based inks, pigment based inks, water-based latex inks, gloss enhancer, etc. The printer 1 is a page-wide array printer comprising a plurality of print heads able to deposit printing fluids (such as colored inks) on media (such as paper).

The printer 1 is able to print color calibration patterns such as arrays of colored rectangles which may be analyzed during calibration (patterns may also comprise other shapes such as hexagons). To this end, the printer 1 comprises a processor 2 and a storage 3. The storage 3 may include any electronic, magnetic, optical, or other physical storage device that stores executable instructions and data. Thus, storage 3 may be, for example, Random Access Memory (RAM), Electrically-Erasable Programmable Read-Only Memory (EEPROM), a storage drive, an optical disc, and the like.

The storage 3 comprises in the present example a plurality 4 of sets of colorimetric values and executable instructions 5.

The plurality of sets of colorimetric values may be received by the printer using a computer controlling the printer 1, or the plurality of sets of device color and colorimetric values may be stored before delivering the printer 1 to its end user.

The plurality of sets of colorimetric values forms a database which may be used to elaborate a calibration pattern. It may also be used during calibration. In each set, colorimetric values of device colors are stored. In each set, at least the colorimetric values for the device colors are stored, although more sets of values may be stored. The device colors may also be stored in correspondence to the colorimetric values.

It should be noted that by device color, what is meant is data interpretable by a printer, for example RGB (Red, Green, Blue) values interpretable by a printer (sometimes called device RGBs), or CMYK (Cyan, Magenta, Yellow, Black) interpretable by a printer (sometimes called device CMYKs), or also ink vectors (i.e., vectors with as many members as there are printing fluids in a printer, where the value of each member expresses an amount of the corresponding printing fluid).

Each colorimetric value may be obtained through a measurement which results in values in a color space, for example CIELAB. In a set of colorimetric values, all the values may have been obtained by a measurement performed on a printed calibration pattern under printing conditions which depend on the printer used for printing this pattern. It should be noted that the printers used for obtaining the plurality of sets of colorimetric values may not include the printer 1 to be calibrated, but they also may include this printer which will then be used to provide the database.

Also, for example, the number of sets of colorimetric values may be such that it covers a variety of states of a printer, including variations in the drop weights and ages of its print heads, different environmental conditions in terms of temperature and relative humidity, etc. E.g., for a printer with four inks or printing fluids (CMYK) and a certain range of drop weight variation across which calibration is expected to work, an example number of sets of colorimetric values would be $3^4$—i.e., all the combinations of each of the inks or printing fluids being at lowest, nominal and highest drop weight.

The executable instructions 5 are executable by the processor and they include an instruction 6 to select a number S of device colors, S being a number which a user may set. This number S may be low to provide a fast calibration, or higher to provide a more accurate calibration. The S device colors are selected according to the color differences between corresponding colorimetric values of the plurality of sets, an instruction 7 to elaborate a color calibration pattern for a printer using the S device colors, an instruction 8 to print, using the printer, the color calibration pattern elaborated using the selected S device colors selected, an instruction 9 to elaborate a set of colorimetric values from the plurality of sets of colorimetric values and adjusted to the printed color calibration pattern, and an instruction 10 to calibrate the printer using the printed color calibration pattern elaborated using the selected S device colors and the elaborated set of colorimetric values.

The instruction 6 to select S device colors according to the color differences between corresponding colorimetric values of the plurality of sets, when executed, may select S device colors which provide the largest color differences among the plurality of sets of colorimetric values.

For example, selecting S device colors comprises calculating a statistical parameter for each device color according to the color differences between corresponding colorimetric values of the plurality of sets, ranking the device colors according to their statistical parameter, selecting the S device colors according to their rank.

The statistical parameter may be the standard deviation which will be computed, for each device color, between all the colorimetric values which correspond to this device color. The device colors having the largest standard deviation may then be ranked higher and selecting the S device colors according to their rank may comprise selecting the S device colors with the highest ranks.

Calculating the statistical parameter may also comprise computing the color difference between each colorimetric value of each set of colorimetric values with the corresponding colorimetric values of all the other sets of colorimetric values and for example using the $95^{th}$ percentile of the resulting distribution of color differences.

It can be noted that in the present disclosure, color difference may be computed using different methods, for example CIEDE2000 or CIEDE1976.

It can also be noted that the number S may be entered by a user of a computer controlling the printer 1, or directly on the printer 1, or it may be stored in the storage 3.

The instruction 7 to elaborate a color calibration pattern for a printer using the S device colors may be used to elaborate a calibration pattern to be used to perform a one-dimensional look-up table method, an N-dimensional look-up table method or an adjustment of Neugebauer Primary area coverages (in a HANS printer imaging pipeline), for example using the plurality 4 of sets of colorimetric values.

The elaborated color calibration pattern may be printed to obtain a pattern comprising elements associated with each device color of the selected S device colors.

Because the S selected device colors were selected according to the differences between the colorimetric values, the elaborated pattern is designed using a limited number of device colors (at least S colors) which will still provide good calibration results if a reference used for calibration is chosen using the plurality of sets of colorimetric values because the device colors are the ones which have the largest variations in the plurality of sets and because the reference used for calibration will match the conditions of the printer.

The instruction 9 to elaborate a set of colorimetric values from the plurality of sets of colorimetric values and adjusted to the printed color calibration pattern may comprise identifying the set of colorimetric values which is the closest to the printed one (or more precisely to the colorimetric values measured from the printed one), or also calculating a new set of colorimetric values to obtain a set of colorimetric values close to the printed one. This results in calibration being performed with a limited set of colors with a reference which is adjusted to the printing conditions of the printer and leads to good accuracy.

Figure 2:
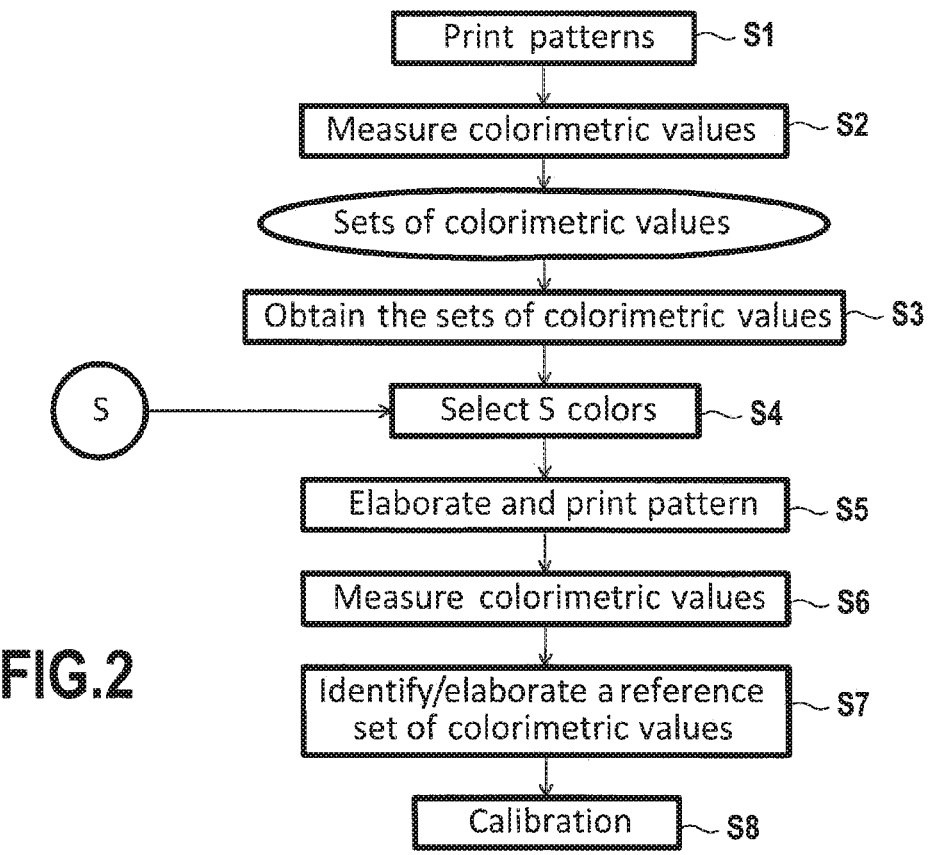
FIG. 2 is flowchart of an example of a method for calibrating a printer.

FIG. 2 is a flowchart of an example of a method for performing calibration of a printer such as the one described in reference to FIG. 1.

Firstly, color calibration patterns are printed under different printing conditions (reference S1). These color calibration patterns each comprise elements that are each associated with device colors. In a color calibration pattern, all the device colors have an associated element, but the color calibration pattern may not be all identical because some color calibration pattern may also comprise additional information.

The different printing conditions may result from using different printers of the same model or not, different sizes of ink (or printing fluid) drop if ink jet printers are used, printing under different environmental conditions.

Then, the colorimetric values of each element of each printed pattern is measured S2 to obtain the plurality of sets of corresponding colorimetric values such as the one described in reference to FIG. 1.

This plurality of sets of colorimetric values is then obtained S3, for example by storing the plurality of sets of colorimetric values in a storage of a printer to be calibrated.

Then, S device colors are selected (reference S4), for example in the same manner as when instruction 6 described in reference to FIG. 1 is executed.

A color calibration pattern can then be elaborated and printed (reference S5) by the printer to be calibrated. The printed pattern comprises a number of elements which may be low depending on the number S. A low number S leads to performing calibration on a low number of device colors which are highly relevant. A higher number S leads to performing calibration on a greater number of device colors in order to obtain a better color accuracy. A good level of flexibility is obtained.

It should be noted that the printed color calibration pattern is associated with a calibration method (for example a one-dimensional look-up table method or an N-dimensional look-up table method).

The colorimetric values of each printed element associated with one of the device colors from the selected S device colors are then measured (reference S6). A user may perform this measurement using various types of sensors and a computing system controlling the printer.

Calibration is performed by comparing measured colorimetric values with other values. In this example, the other values are elaborated using the plurality of sets of colorimetric values. This leads to using colorimetric values which match the printing conditions of the printer to be calibrated, which allow calibration using a small number of colors because the remaining colors are likely to match the ones of the elaborated set.

For example, an elaborated set of colorimetric values may be identified among the plurality of sets of colorimetric values, the elaborated set of colorimetric values being the set having colorimetric values associated with the S device colors which are the closest to the measured colorimetric value of each element of the printed color calibration pattern elaborated using the S device colors. A statistical parameter may be used to identify the elaborated set. Also, identifying the elaborated set may comprise selecting the set of colorimetric values having the smallest 95% percentile of difference with respect to the measured colorimetric values Also for example, the elaboration of the elaborated set may comprise:

identifying T sets of colorimetric values among the plurality of sets of colorimetric values, the T sets of colorimetric values being the sets having colorimetric values associated with the selected S device colors which are the closest to the measured colorimetric value of each element of the printed color calibration pattern elaborated using the selected S device colors, calculating colorimetric values of the elaborated set using a statistical calculation and the T sets of colorimetric values. For example, the statistical calculation may comprise, for each device color, calculating the convex weight derived from the color differences of the T sets, and using this convex weight to obtain an elaborated colorimetric value for the elaborated set.

Finally, the calibration is performed using the printed color calibration pattern and the elaborated set of colorimetric values which has been elaborated from the plurality of sets of colorimetric values and is adjusted to the printed color calibration pattern.

Figure 3:
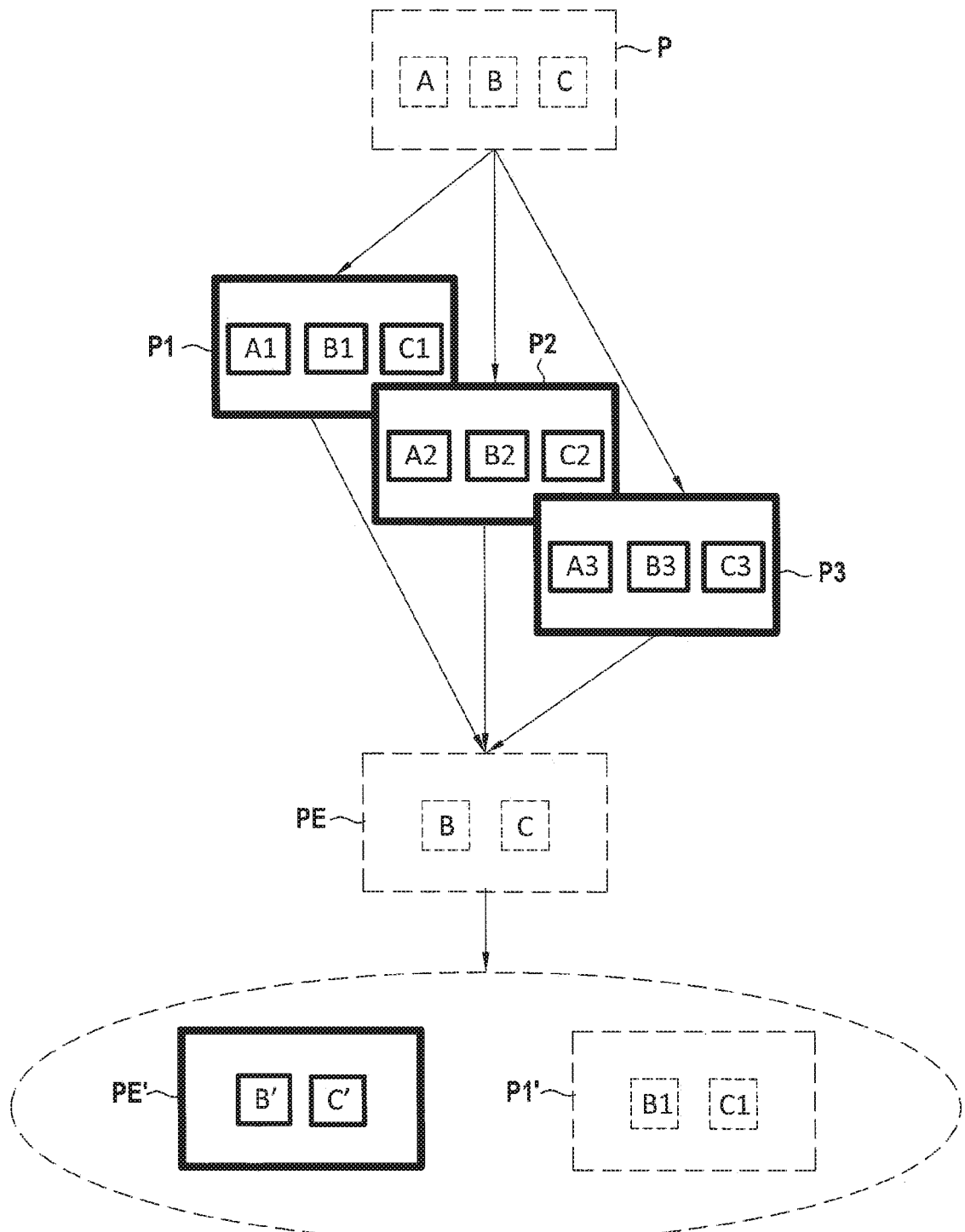
FIG. 3 is an illustration of examples of calibration patterns.

FIG. 3 shows examples of the various color calibration patterns used when performing a method as described in reference to FIG. 2. The color calibration patterns shown on FIG. 3 may be printed on paper, which is represented by the use of a thick line contour. A color calibration pattern interpretable by a printer before being printed is shown using dotted lines.

An initial color calibration pattern P is shown having three elements each associated with a device color A, B, or C. This initial pattern P may be the pattern which will be printed under different printing conditions as disclosed in reference to FIG. 2.

Three color calibration patterns P1, P2, and P3 are then obtained by printing under different printing conditions the color calibration pattern P.

Printed color calibration pattern P1 comprises three elements having colorimetric values which can be measured. For device color A, printed color calibration pattern P1 comprises an element having a measured colorimetric value of A1. Similarly, for device color B, the measured colorimetric value is B1, and for device color C, the measured colorimetric value is C1.

For printed color calibration pattern P2, for device color A, the measured colorimetric value is A2, for device color B, the measured colorimetric value is B2, and for device color C, the measured colorimetric value is C2. For printed color calibration pattern P3, for device color A, the measured colorimetric value is A3, for device color B, the measured colorimetric value is B3, and for device color C, the measured colorimetric value is C3. Three sets of colorimetric values are then obtained, the first one comprising A1, B1, and C1, the second one comprising A2, B2, and C2, and the third one comprising A3, B3 and C3.

If a user chooses to select only two colors (S equals 2), then it is possible to select two device colors among A, B, and C according to the color differences between corresponding colorimetric values of the plurality of sets, namely the color differences between A1, A2 and A3, the color differences between B1, B2 and B3, and the color differences between C1, C2 and C3.

If device colors B and C show the largest differences (for example if the standard deviation for B1, B2, and B3, and the standard deviation for C1, C2, and C3 are bigger than the standard deviation for A1, A2 and A3), then they are the selected two device colors.

A color calibration pattern PE can then be elaborated comprising only B and C.

Using the color calibration pattern PE, a printed color calibration pattern PE' can be obtained having elements which have colorimetric values B' and C'. For calibration, an elaborated set of colorimetric values may be identified as being the closest to PE', and in this example, the elaborated set is P1', corresponding to P1 but only showing the relevant colorimetric values which will be used during calibration. This set matches the printing conditions of the printer to be calibrated here.

It can be noted that in the above examples, color calibration is performed using various methods, providing good flexibility. Also, the color calibration is performed on a number of device colors which can be reduced, which results in a fast calibration process. The accuracy of the calibration can be adjusted using the number S. No assumption of color space sampling regularity is used to obtain the S device colors, which provides good flexibility and color accuracy. Also, it can be noted that multiple calibration methods of various types may be used simultaneously on the S device colors.

The invention claimed is:

1. A method of a system comprising a hardware processor, comprising:

receiving a plurality of sets of colorimetric values for different colors obtained under respective different printing conditions, wherein a first set of colorimetric values is obtained under a first printing condition, and a second set of colorimetric values is obtained under a second, different printing condition, wherein a first colorimetric value of the first set and a corresponding first colorimetric value of the second set are for a first color, and a second colorimetric value of the first set and a corresponding second colorimetric value of the second set are for a second, different color;

selecting a subset of the different colors according to color differences between corresponding colorimetric values of the plurality of sets, the color differences comprising a first color difference based on the first colorimetric values of the first and second sets, and a second color difference based on the second colorimetric values of the first and second sets;

causing printing, using a printer, of a color calibration pattern comprising the subset of the different colors;

determining a set of colorimetric values from the plurality of sets of colorimetric values based on a measurement of the printed color calibration pattern; and calibrating the printer using the printed color calibration pattern and the determined set of colorimetric values.

2. The method of claim 1, comprising obtaining the plurality of sets of colorimetric values based on:

printing a plurality of color calibration patterns under the respective different printing conditions; and measuring a colorimetric value of each element of each color calibration pattern of the plurality of color calibration patterns to obtain the plurality of sets of colorimetric values.

3. The method of claim 1, wherein selecting the subset of the different colors comprises:

calculating a statistical parameter for each respective color of the different colors according to the color differences between the corresponding colorimetric values of the plurality of sets;

ranking the different colors according to the statistical parameters; and selecting the subset of the different colors according to the ranking.

4. The method of claim 3, wherein calculating the statistical parameter for the first color comprises computing color differences between a first colorimetric value of a set of colorimetric values with corresponding first colorimetric values of other sets of colorimetric values.

5. The method of claim 3, wherein calculating the statistical parameter for the first color comprises calculating a standard deviation between first colorimetric values of the plurality of sets.

6. The method of claim 1, wherein receiving the plurality of sets of colorimetric values comprises receiving the plurality of sets of colorimetric values from a storage medium in the printer.

7. The method of claim 1, wherein the printed color calibration pattern comprises elements associated with respective colors of the subset of the different colors, the method comprising:
receiving a measured colorimetric value of each element of the printed color calibration pattern.

8. The method of claim 7, wherein determining the set of colorimetric values from the plurality of sets of colorimetric values comprises identifying the set of colorimetric values among the plurality of sets of corresponding colorimetric values having colorimetric values associated with the selected subset of the different colors that are closest to the measured colorimetric values of the elements of the printed color calibration pattern.

9. The method of claim 7, wherein determining the set of colorimetric values from the plurality of sets of colorimetric values comprises:
identifying, from among the plurality of sets of colorimetric values, multiple sets of colorimetric values that have colorimetric values associated with the subset of the different colors that are closest to the measured colorimetric values of the elements of the printed color calibration pattern; and
calculating colorimetric values for the determined set of colorimetric values using a statistical calculation based on differences of colorimetric values in the multiple sets of colorimetric values.

10. The method of claim 1, wherein calibrating the printer is performed using a one-dimensional look-up table method, an N-dimensional look-up table method, or an adjustment of Neugebauer Primary area coverages in a HANS printer imaging pipeline.

11. A device comprising:
a processor; and
a storage medium storing instructions executable on the processor to:
receive a plurality of sets of colorimetric values for different colors obtained under respective different printing conditions, wherein a first set of colorimetric values is obtained under a first printing condition, and a second set of colorimetric values is obtained under a second, different printing condition, wherein a first colorimetric value of the first set and a corresponding first colorimetric value of the second set are for a first color, and a second colorimetric value of the first set and a corresponding second colorimetric value of the second set are for a second, different color;
select a subset of the different colors according to color differences between corresponding colorimetric values of the plurality of sets, the color differences comprising a first color difference based on the first colorimetric values of the first and second sets, and a second color difference based on the second colorimetric values of the first and second sets;
cause printing, using a printer, of a color calibration pattern comprising the subset of the different colors;
determine a set of colorimetric values from the plurality of sets of colorimetric values based on a measurement of the printed color calibration pattern; and
calibrate the printer using the printed color calibration pattern and the determined set of colorimetric values.

12. The method of claim 1, further comprising:
comparing the first color difference to the second color difference,
wherein selecting the subset of the different colors comprises selecting the first color and not selecting the second color based on the comparing.

13. The method of claim 12, wherein selecting the subset of the different colors comprises selecting colors associated with largest variances in color differences between corresponding colorimetric values of the plurality of sets.

14. The method of claim 9, wherein the statistical calculation computes convex weights derived from the differences of colorimetric values in the multiple sets of colorimetric values.

15. The device of claim 11, wherein the instructions are executable on the processor to:
compare the first color difference to the second color difference,
wherein the selecting of the subset of the different colors comprises selecting the first color and not selecting the second color based on the comparing.

16. The device of claim 15, wherein the selecting of the subset of the different colors comprises selecting colors associated with largest variances in color differences between corresponding colorimetric values of the plurality of sets.

17. The device of claim 11, wherein the printed color calibration pattern comprises elements associated with respective colors of the subset of the different colors, and wherein the instructions are executable on the processor to:
receive a measured colorimetric value of each element of the printed color calibration pattern,
wherein the determining of the set of colorimetric values from the plurality of sets of colorimetric values comprises identifying the set of colorimetric values among the plurality of sets of corresponding colorimetric values having colorimetric values associated with the selected subset of the different colors that are closest to the measured colorimetric values of the elements of the printed color calibration pattern.

18. The device of claim 11, wherein the printed color calibration pattern comprises elements associated with respective colors of the subset of the different colors, and wherein the instructions are executable on the processor to:
receive a measured colorimetric value of each element of the printed color calibration pattern,
wherein the determining of the set of colorimetric values from the plurality of sets of colorimetric values comprises:
identifying, from among the plurality of sets of colorimetric values, multiple sets of colorimetric values that have colorimetric values associated with the subset of the different colors that are closest to the measured colorimetric values of the elements of the printed color calibration pattern; and
calculating colorimetric values for the determined set of colorimetric values using a statistical calculation based on differences of colorimetric values in the multiple sets of colorimetric values.

19. A non-transitory machine-readable storage medium comprising instructions that upon execution cause a system to:

receive a plurality of sets of colorimetric values for different colors obtained under respective different printing conditions, wherein a first set of colorimetric values is obtained under a first printing condition, and a second set of colorimetric values is obtained under a second, different printing condition, wherein a first colorimetric value of the first set and a corresponding first colorimetric value of the second set are for a first color, and a second colorimetric value of the first set and a corresponding second colorimetric value of the second set are for a second, different color;

select a subset of the different colors according to color differences between corresponding colorimetric values of the plurality of sets, the color differences comprising a first color difference based on the first colorimetric values of the first and second sets, and a second color difference based on the second colorimetric values of the first and second sets;

cause printing, using a printer, of a color calibration pattern comprising the subset of the different colors;

determine a set of colorimetric values from the plurality of sets of colorimetric values based on a measurement of the printed color calibration pattern; and calibrate the printer using the printed color calibration pattern and the determined set of colorimetric values.

20. The non-transitory machine-readable storage medium of claim 19, wherein the instructions upon execution cause the system to:

compare the first color difference to the second color difference, wherein the selecting of the subset of the different colors comprises selecting the first color and not selecting the second color based on the comparing.

* * * * *